Nov. 29, 1938.  J. A. HICKS  2,138,235
VEHICLE BRAKE EQUALIZER
Filed Oct. 26, 1935  3 Sheets-Sheet 1
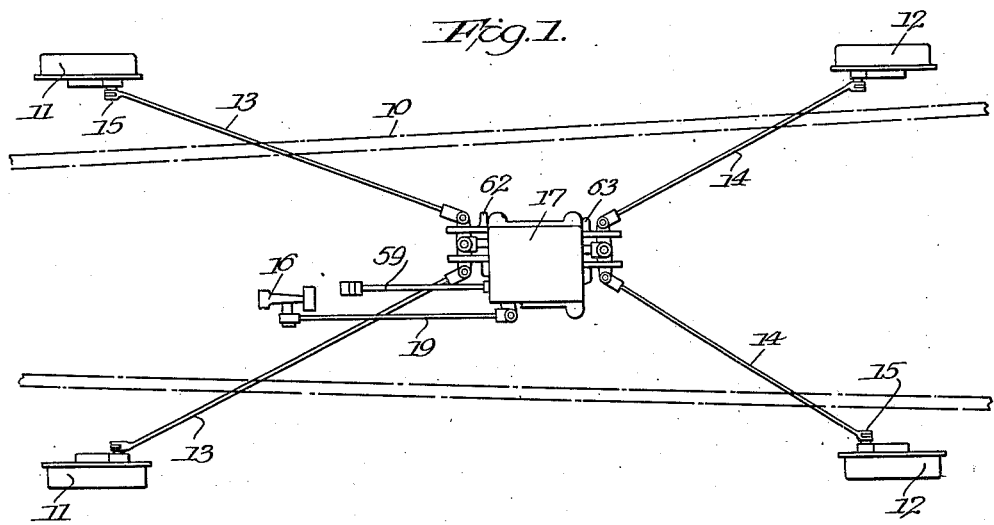
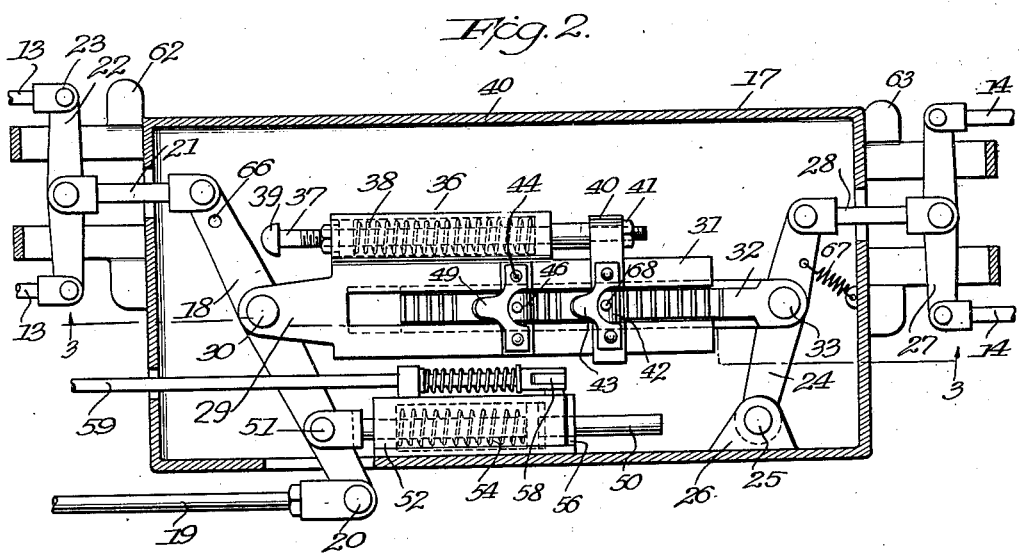
Inventor
James A. Hicks
By Cushman, Darby & Cushman
Attorneys Nov. 29, 1938.  J. A. HICKS  2,138,235
VEHICLE BRAKE EQUALIZER
Filed Oct. 26, 1935  3 Sheets-Sheet 2
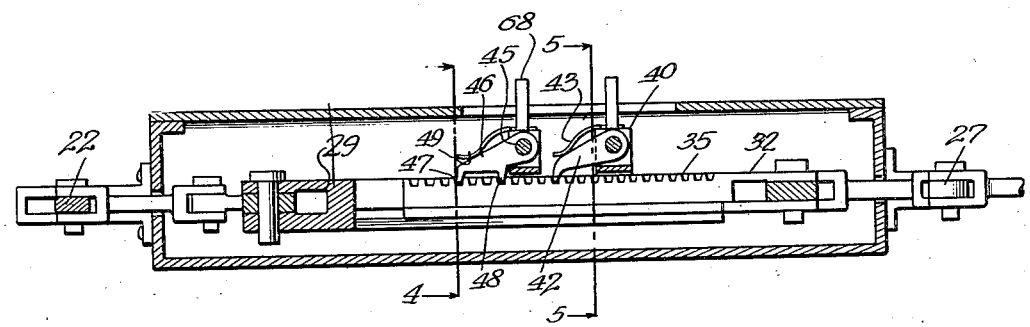
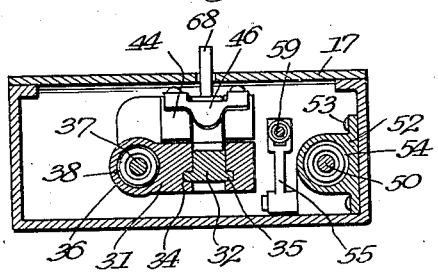
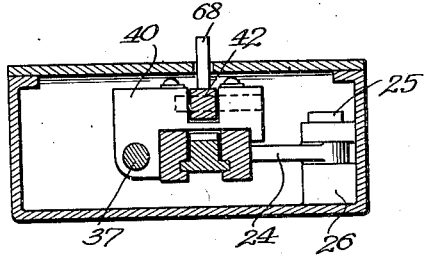
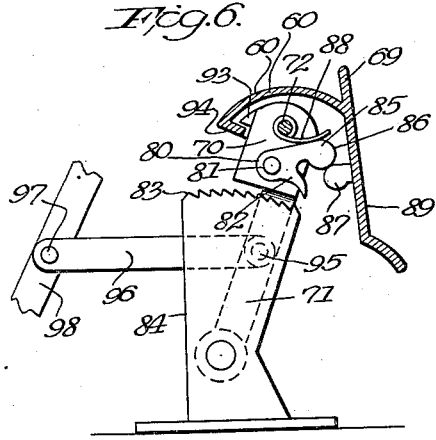
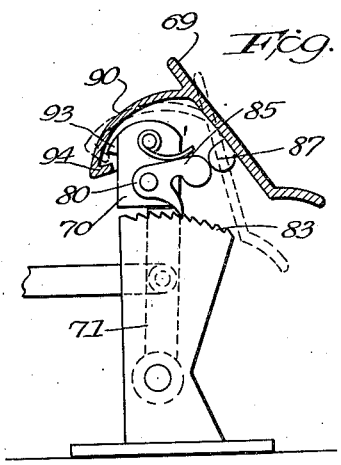
Inventor
James A. Hicks
By [signature]
Attorneys

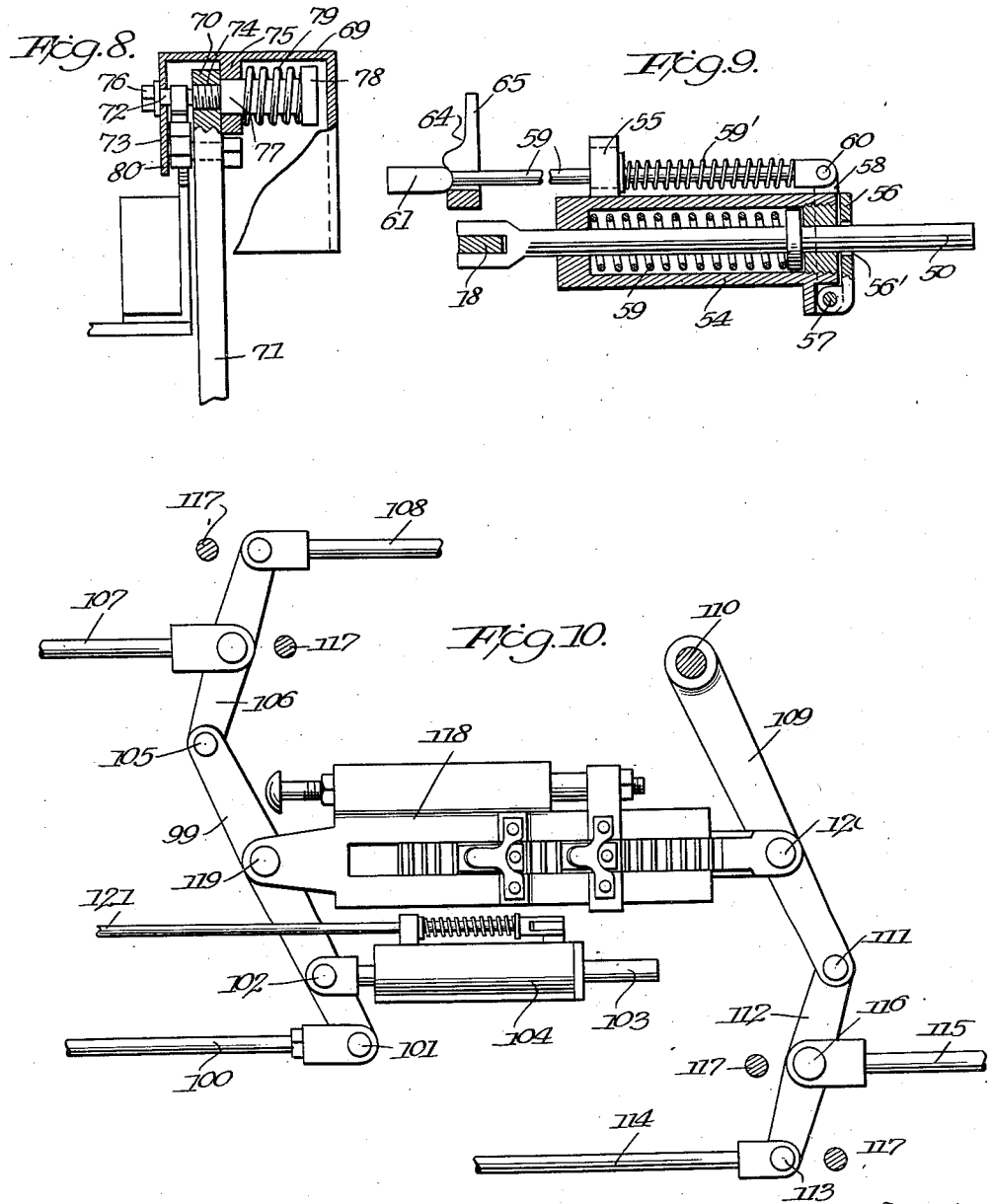

Patented Nov. 29, 1938

2,138,235

UNITED STATES PATENT OFFICE 2,138,235

VEHICLE BRAKE EQUALIZER

James Amos Hicks, Atlanta, Ga., assignor of one-half to A. L. Belle Isle, Atlanta, Ga.

Application October 26, 1935, Serial No. 46,938

12 Claims. (Cl. 188—196)

The present invention relates to an improved brake equalizing mechanism for motor vehicles.

An important object of the invention is to provide a simple, efficient, economical and durable brake equalizer, which is flexible in its movement, positive in operation and which can be readiliy installed as a part of the braking apparatus on various types of vehicles.

A further object comprehends the provision of an equalizer including a pair of brake levers, an adjusting mechanism operatively connected to the brake levers, and means for normally moving the brake levers and adjusting mechanism as a unit to apply the brakes, said means also being operable to move the brake levers towards each other to actuate the adjusting mechanism to automatically take up slack or wear in the braking apparatus.

A further object consists in providing a brake equalizer which is connected to each of the brake shoes in such a manner as to automatically adjust for wear without altering or requiring adjustment of the other parts of the braking apparatus, and in which each brake shoe will be given proper clearance at all times and the movement of the brake pedal will be uniformly controlled.

A further object consists in associating a brake adjusting device with operating instrumentalities so that the actuation of the device effects a positive and flexible equalization of braking pressure on each of the brake shoe drums.

Another object consists in an improved foot pedal structure for maintaining the brakes in their applied positions and which dispenses with the use of an emergency or hand brake.

A further object consists in providing means for insuring the uniform application of braking power to the front and rear wheels, and also means for varying the percentage of the braking power so that the braking power applied to the front wheel brakes may be greater or less than that applied to the rear wheel brakes.

A still further object consists in providing a brake equalizer with means which, in the event of one or more of the brake rods being rendered inoperative, insures the efficient operation of the other brakes on the vehicle.

Other objects and advantages of the invention will become apparent from the following description when taken in conjunction with the following claims and drawings.

Referring to the drawings in which are shown preferred embodiments of the invention:

Figure 1 is a plan view of a chassis frame showing the invention applied thereto.

Figure 2 is a detailed plan view of the brake equalizer with the cover removed.

Figure 3 is a sectional view taken substantially along the line 3—3 of Figure 2.

Figure 4 is a sectional view taken substantially along the line 4—4 of Figure 3.

Figure 5 is a sectional view taken substantially along the line 5—5 of Figure 3.

Figure 6 is a sectional view of an improved pedal structure which may be associated with the device and shows the locking instrumentalities in their raised or released positions.

Figure 7 is a view substantially similar to Figure 6 with the parts in their locked position.

Figure 8 is a front elevation of Figure 6 with parts broken away.

Figure 9 is a detail sectional view of the brake release mechanism with parts broken away.

Figure 10 is a plan view of a modified form of the invention.

Referring to the drawings in which like numerals indicate like parts in the several views, 10 designates the chassis frame of a motor vehicle, 11 the brake drums of the front wheels, and 12 the brake drums of the rear wheels. The front and rear pair of brake rods 13 and 14 are connected to their respective brake shoes or cams 15′ as at 15.

In order to provide means for insuring a positive equalization of pressure to the brakes and at the same time take up any slack or wear between the parts of the braking apparatus, the brake rods 13 and 14 are operatively connected to the foot pedal 16 through the instrumentality of a brake equalizing mechanism connected to the vehicle at a point substantially centrally of the chassis. As shown, the equalizing device is enclosed within a casing 17 suitably secured to the underside of the vehicle. Positioned within the casing 17 is a floating lever 18 which has one end thereof extending through the side of the casing so as to be pivotally connected to the foot pedal 19 as at 20. The opposite end of the lever 18 is connected through the rod 21 with an equalizing bar 22, which in turn is connected to the front brake rods 13 as at 23. Coacting with the lever 18 is a rear brake lever 24 which is pivoted at one end as at 25, to a fixed bracket 26 on the inside of the casing 17. The opposite end of the lever 24 is connected to an equalizing lever 27 by a link 28, and the equalizing lever 27 is pivotally connected at its ends to the rear brake rods 14.

The front brake lever 18 is connected to the rear brake lever 24 by an adjusting or compensating device which in the normal operation of the brakes constitutes a rigid connection between the brake levers, but which is so constructed as to move the brake levers towards each other to automatically take up any slack or wear which may develop in the parts of the braking apparatus during the operation of the vehicle. The adjusting device includes a yoke member 29 connected at its outer end as at 30 to an intermediate portion of the front brake lever 18 and has its arms 31 spaced apart to snugly receive a complementary telescopic member or bar 32 pivoted as at 33 to the rear brake bar 24.

The opposing inner walls of the arms 31 are preferably provided with recesses 34 (Figure 4) which receive the flanges 35 on the bottom or lower end of the member 32 so as to guide the members during their reciprocating movement relative to each other. The member 29 preferably has extending integrally therefrom a housing 36 through which extends a reciprocating governor or threaded rod 37. Carried by the rod 37 is a collar 36' which is adjustably held in position by a nut 38' secured to the rod 37. The collar 36' and the nut 38' are freely movable through the opened adjacent end of the housing 36. A coiled spring 38 carried by the rod 37 is confined between the collar 36' and the closed end 39' of the housing. It will be seen that the compression of the spring 38 may be controlled by the adjusting of the nut 38'. The spring 38 acts to return the governor 37 to its initial position when the latter is moved axially away from the brake bar 18. The outer end of the rod 37 is provided with an enlarged head 39 which normally is spaced from the brake bar 18 and is arranged to be actuated thereby in a manner as will be subsequently described. The opposite end of the rod 37 extends an appreciable distance beyond the housing 36 and has fixedly secured thereto a laterally disposed carriage or supporting member 40 held firmly on the rod by the jamb nut 41. A sleeve or spacer member 40' may be threaded to the rod 37 and be positioned between the end 39' of the housing and the member 40. Pivotally mounted on the carriage 40 and in direct alignment with the member 32 is an adjusting or take up dog 42 (Figure 2) which is normally urged into engagement with the teeth 35 by a spring 43. Extending upwardly from the arms 31 are a pair of spaced bearing members 44 to which is pivotally connected as at 45 a holding dog 46 having spaced projections 47 and 48 which engage the teeth 35 on the member 32. A spring 49 tends yieldably to maintain the dog 46 against the teeth.

To supplement the use of an emergency or hand brake, I provide a holding device which includes a rod 50 pivoted as at 51 to the front brake lever 18 and which extends through a housing 52 connected as at 53 to the casing 17 (Figure 4). Surrounding the rod 50 and confined within the housing 52 is a coiled spring 54 which is compressed upon the brakes being applied and acts as a quick release for returning the parts to their normal operative positions. The rod 50 is supported by the housing 52 and acts as a guide and support for the adjacent end of the floating lever 18, thus insuring this lever and its associated parts being maintained in proper alignment. In order to maintain the brakes applied, there is associated with the rod 50 a locking plate 56 which has an opening 56' through which the rod 50 extends. The lower end of the plate 56 is connected to a horizontal arm 57 of a bell crank lever which in turn has its upper arm 58 pivotally connected to a rod 59 as at 60 (Figure 9). The outer end of the rod 59 has a handle 61 conveniently positioned adjacent the seat of the driver and is arranged to be manually operated to move the plate 56 against the rod 50 to prevent further axial movement of the rod until the plate is released.

As shown in Figure 9, the handle 61 is in its released position and when it is moved to engage the upper notch 64 on the member 65, it actuates the rod 59 which in turn tilts the plate 56 so as to move the wall of the opening 56' into frictional engagement with the rod 50, thus maintaining the parts in locked position.

It will be seen that my improved holding device supplements or dispenses with the use of the customary emergency or hand brake and insures the positive locking of the brakes in any predetermined position and at the same time effects a quick and positive release of the brakes when desired.

The casing 17 has extending from one end thereof a pair of spaced stops 62 which act as abutments for the equalizing lever 22. The opposite end of the casing is similarly formed with stops 63 which constitute abutments for the equalizing lever 27.

In operation, assuming that the brake shoe of each wheel has been adjusted so as to be set at the proper clearance relative to its brake drum, the equalizing device is adjusted so as to control and maintain this clearance substantially constant and uniform throughout the life of the car, and thus maintains the ratio of the braking pressure uniform regardless of the wear on the shoes.

When slack occurs in the brake rods for any reason, it will increase the throw of the foot pedal 16 which in turn causes the brake bar 18 to engage the head 39 of the rod 37 so as to move the latter, thus compressing the spring 38 in the housing 36. As the carriage 40 is bodily movable with the rod 37, the dog 42 rides over the teeth 35, while the dog 46 during this riding movement firmly engages the teeth 35 to prevent movement of the members 29 and 32 relative to each other.

When the foot pedal 16 reaches the maximum limit of its throw, the dog 42 engages the teeth and the spring 38 expands, causing the rod 37 to be returned to its initial position. During this return movement the projections 47 and 48 on the dog 46 are raised out of engagement with the teeth 35. As the dog 42 is locked to the teeth 35 it will cause the rod member 32 to be moved with the carriage 40 during the return movement of the rod 37, thus moving the members 29 and 32 closer towards each other, which in turn moves the brake levers 18 and 23 so as to take up any fractional slack or wear in the braking apparatus.

The length of travel of the carriage 40 is determined by the amount of slack which has to be taken up. When the slack is small, the dog 42 is moved one notch at a time which in turn causes the dog 46 to be advanced the same distance. When a large amount of slack has to be taken up, such as in the initial setting of the device, it is necessary to reciprocate the foot pedal a sufficient number of times to compensate for this slack so as to insure the application of the brakes when they are applied by the foot pedal. In any event, when the slack becomes such as to cause the lever 18 to move the rod 37 and carriage 40 a distance of one notch or more relative to the rod 32, the equalizer will operate automatically to take this slack up.

It will be noted that the front lever 18 is floatingly mounted so as to constitute a movable support, while the rear lever 24 is pivoted at one end. During the operation of the equalizer the levers 18 and 24 are positioned to be moved toward each other so as to coact with the adjusting device to take up slack or wear of the parts and at the same time insure a uniform application of the brakes upon the actuation of the foot pedal. In ordinary operation of the brake control, the levers 18 and 24 are connected to the adjusting device in such a manner that these parts are bodily movable as a unit. However, as soon as slack occurs in any part of the apparatus sufficient for the brake lever 18 to move the rod 37 and carriage 40 to cause dog 42 to move a distance of one of the teeth 35, the compensating device operates to take up the slack in the manner as previously described.

Should one of the front or rear brake rods break or otherwise become inoperative, the stops associated with the equalizing levers provide for the efficient operation of the other brake rods. Thus, should the brake rod 13, connected to the right front wheel, be rendered inoperative, the equalizing lever 22 will have its adjacent end moved against the aligned stop 62. This causes an increase in the throw of the foot pedal which, upon being operated, causes the equalizing device to take up the slack sufficiently to readjust the braking power. In other words, by reason of this emergency feature, means are provided for insuring the operation of the remaining brake rods when one of the brakes for any reason becomes inoperative. Should both the front brake rods, or the rear brake rods become defective, their equalizing levers would be moved into engagement with their adjacent stops 62 and 63, and the increased throw of the pedal would cause the adjusting device to operate so as not to impair the efficiency of the remaining brakes.

As shown, the front brake lever 18 is longer than the brake lever 24 and may be provided with a series of longitudinally extending openings 66 (Figure 2) arranged to be selectively connected to the adjacent end of the rod 21 for the purpose of varying the percentage of braking power applied to the front and rear wheels. Since the leverage of the lever 18 and its connection with the rod 21 is greater than the leverage of the rod 24 with the rod 28, a greater percentage of braking power will be applied to the rear wheels than to the front wheels. When the rod 21 is connected to the lever 18 at the point 66, a uniform application of braking power will be applied to both the front and rear wheels due to the fact that the leverage of both arms is the same. Conversely, should it be desired to increase the braking power of the front wheels, the rear brake lever 24 could be proportionately lengthened so as to increase its leverage relative to the front brake lever 18.

In the operation of the apparatus, there is a tendency for the rear brake lever 24, when slack is being taken up, to move abruptly or suddenly toward the lever 18 with the consequent result that the bar 32 has a tendency to move inwardly with a slight axial play, which interferes with the proper take up of the dog 42. In order to overcome this defect a spring 67, carried by the casing is connected to the brake bar 24 so as to cushion or absorb the return of bar 24.

When it is desired to replace a brake drum or dismantle one of the wheels for repairs, the engagement of the dogs 42 and 46 with the teeth on the bar 32 is released by means of the flexible members or rods 68 which are connected to the dogs and are located on the vehicle so as to be and simultaneously conveniently operable. The foot pedal 16 may then be depressed, which permits the free movement of the members 29 and 32 relative to each other, thus allowing the necessary slack in the brake rods to permit the dismantling of the wheels.

It will be observed that when the brake is applied and the rod 37 is moved inwardly by the lever 18 to compress the spring 38, the latter remains in its contracted position until the brake is released, whereupon it is returned to its expanded position, thus providing the necessary means to insure the proper adjustment and control of the slack action. In other words, the automatic take up of the braking apparatus is effected on the release of the brake and not during the brake applying movement of the brake instrumentality.

In Figures 6, 7 and 8, there is shown an improved foot pedal structure which may be used to supplement the emergency hand brake and the locking device 59, previously described.

This structure comprises a hood or pedal member 69 movably connected to the upper enlarged end 70 of an auxiliary pedal bar 71 by a bolt 72. The bolt 72 extends through the end flange 73 and has a threaded portion 74 engaging a complementary threaded portion on the pedal bar 71. The bolt also extends through an opening in the web 75 on the member 69. The outer end of the bolt is threaded to a nut 76, while the inner end of the bolt has an enlarged portion 77 which terminates in a polygonal head 78. Carried by the bolt 72 and confined between the web 75 and the head 78, is a coil spring 79. In assembling the parts, the bolt 72 with the spring 79 thereon is passed through the opening in the web 75 and is threaded at 74 to the bar 71. The nut 76 is then applied to the outer exposed end of the bolt. Thus, it will be seen that means are provided for not only firmly securing the bolt 72 to the pedal bar 71, but also for permitting the movement of the member 69 about the bolt so that it is yieldably maintained in its various operative positions.

A holding member 80 pivotally mounted as at 81 to the pedal bar 71 has a latch 82 arranged to releasably engage the teeth 83 on a ratchet or quadrant 84 secured to the vehicle. The member 80 has an arm 85 positioned above the latch 82 which terminates in an enlarged curved head 86 arranged to engage and be moved by a curved projection 87 on the hood 69 to cause the latch 82 to be raised out of engagement with the teeth 81 to permit the free movement of the pedal bar 71. The bolt 72 carries a spring 88 which bears against the arm 85 normally to maintain the latch in engagement with the teeth 83. The foot member 69 is preferably provided with an inclined foot engaging portion 89 and an outwardly curved portion 90 which acts as a housing for the upper end of the auxiliary pedal bar 71. The foot engaging portion 89 is arranged when pressed forwardly to cause the actuation of the pedal bar 71 so as to apply the brakes and takes the place of the usual brake pedal. Additionally, the hood 69 moves about its pivot 72 so as to move independently of the foot pedal bar 71 by applying either a toe or heel pressure to the foot portion 89 depending upon whether it is desired to swing the hood in a clockwise or counter-clockwise direction.

The upper portion of the pedal bar 71 may be provided with a retaining lug 93, while the curved portion 90 of the hood 69 preferably has its outer end terminating in a stop flange 94 arranged to abut the bar to limit the movement of the foot member 69 in a counter-clockwise direction.

The auxiliary pedal bar 71 is connected as at 95 to a link 96 secured at 97 to the main pedal bar 98, which in turn is operatively connected to the rod 19 (Figure 1) for controlling the application of the brakes and the equalizing device.

As shown in Figure 6, the auxiliary pedal bar 71 is in the brake released position and the foot member 69 is moved or tilted so that the arm 85 is raised by the projection 87 to maintain the latch 82 out of engagement with the teeth 83 to permit the free operation of the pedal bar for controlling the application and release of the brakes. Additionally, the flange 94 is in engagement with the stop 93 to limit the further movement of the member 69 in a clockwise direction.

To apply the brakes, the operator presses his foot forwardly on the foot portion 89 which in turn moves the auxiliary pedal bar 71 and its associated parts to the position as shown in dotted lines in Figure 7. When the parts are in this position and it is desired to hold the brakes applied, the operator tilts the toe of the foot portion 89 to move the same in a counter-clockwise direction so that it will assume the position as shown in full lines in Figure 7. This movement causes the projection 87 to be moved out of engagement with the arm 85 and the tension of the spring 88 moves the dog 82 into engagement with the teeth 83 of the ratchet, thus positively locking the brakes in their applied position. The engagement of the stop flange 94 with the auxiliary pedal bar 71 limits the further outward movement of the pedal member 69. When it is desired to release the brakes, it is merely necessary for the operator to apply pressure to the heel of the foot portion 89 which causes the projection 87 to be moved under and raise the arm 85 which in turn moves the latch 82 out of engagement with the teeth 83, so that the auxiliary pedal bar 71 and main pedal bar 91 may be moved as desired for controlling the movement of the vehicle.

It will be seen that the auxiliary pedal bar 71 supplements the use of the main pedal bar and also dispenses with the necessity of employing an emergency or hand brake for maintaining the brakes in applied position.

In Figure 10 is shown a modified form of the invention in which the compensating device is substantially similar in construction and operation to its corresponding parts previously described. However, instead of connecting the front brake levers to the front wheels and the rear brake levers to the rear wheels, there is provided means for connecting one of the levers to the front and rear brake shoes or cams on one side of the vehicle and means for connecting the other brake lever to the front and rear shoes or cam on the opposite side. In the modified structure the floating lever 99 is connected at its outer end to the foot pedal rod 100 as at 101 and is also connected at 102 to the rod 103 of the spring release mechanism 104. The inner end of the lever 99 is connected at 105 to an equalizing lever 106. The equalizing lever 106 is connected by the brake rod 107 to the brake shoe of the right front wheel, while the brake rod 108 connects the lever 106 to the brake shoe of the right rear wheel.

The rear brake lever 109 is pivoted at one end as at 110 to a fixed portion of the vehicle while its opposite end is pivotally connected at 111 to an equalizing lever 112 which is connected at 113 to a brake rod 114 which extends from the brake shoe of the left front wheel. The brake rod 115 connects the brake shoe of the left rear wheel to the equalizing rod 112 as at 116. Associated with the floating equalizing levers 106 and 112, so as to be positioned in alignment with their pivotal connection with the brake rods, are the fixed stops 117 which, in the event of one of the brake rods becoming inoperative or broken, constitutes a fulcrum about which the equalizing lever may be moved so that when the slack is taken up by the adjusting device, the remaining brake rods will act to efficiently apply the brakes. A compensating device 118 substantially similar in construction to the equalizer previously described, is connected to the front brake lever 99 at 119 and to the rear brake lever at 120, so that when slack or wear occurs in the braking apparatus, the equalizer will be actuated by movement of the foot pedal and lever 99 to automatically adjust the parts to take up this slack.

The brakes may be locked in their applied position through the instrumentality of the bar 121, which operates the holding means in substantially the same manner as the rod 59. If desired, the improved foot pedal structure shown in Figures 6, 7 and 8 may be substituted for this locking means.

It will, therefore, be seen that by reason of the novel leverage connection and adjusting instrumentalities, that means are provided for insuring the uniform application of the brakes, said means also automatically compensating for wear by controlling the travel of the brake pedal as well as maintaining the proper connection of the brake shoes with the apparatus irrespective of any wear or slack of the braking apparatus. The slack adjuster is controlled by the operation of the foot pedal so that any variation of slack changes the travel of the foot pedal and, therefore, actuates the adjusting device, thus maintaining the braking conditions of the car at a standard, so as to insure the proper and efficient transmission of the braking power.

The equalizing apparatus also efficiently takes care of differential shoe wear and will uniformly apply the brakes irrespective of the difference in thickness of the shoes or lining. Consequently, the apparatus operates to insure greater efficiency in braking and due to the uniform application of the braking power increases the life of the tires and reduces to a minimum the danger of the car turning over when travelling at high speeds on sharp turns. Additionally, the equalizing apparatus insures proper ratio of the braking power to each of the wheels of the vehicle and may be varied when desired.

It will be understood that the forms of the invention shown are merely illustrative of preferred embodiments and that such changes may be made as fall within the purview of one skilled in the art without departing from the spirit of the invention and the scope of the appended claims.

I claim:

1. A brake equalizing device for vehicles including a pair of brake levers, means positively connecting the levers to the brakes, a yoke member connected to one of the levers, a bar member connected to the other lever and having its free end portion movable between the arms of the yoke member, means normally preventing movement of the members relative to each other, a movable carriage operable by one of said levers, said carriage having means releasably securing it to said bar member, and means when the carriage is held by the bar member for moving said members and levers towards each other to take up slack in the braking apparatus.

2. A brake equalizing device for vehicles including a pair of brake levers, means positively connecting the levers to the brakes, a yoke member connected to one of the levers, a bar member connected to the other lever and having its free end portion movable between the arms of the yoke member, means normally preventing movement of the members relative to each other, said bar member having spaced teeth in the upper surface thereof, a movable carriage operable by one of said levers, said carriage having a pawl pivotally mounted thereon and arranged to releasably engage said teeth for locking the bar member to the carriage, means when the carriage is held by the bar member for releasing the engagement of said members with each other, and means when said members are released for returning the carriage to its initial position, whereby said members are moved towards each other to take up slack in the braking apparatus.

3. A brake equalizing device for vehicles including a pair of brake levers, means operatively connecting the levers to the brakes, a yoke member connected to one of the levers, a bar member connected to the other lever and having its free end portion movable between the arms of the yoke member, said bar member having a series of teeth on the surface thereof, a holding device carried by said yoke member and arranged to engage said teeth for preventing movement of the members relative to each other, a reciprocating governor rod carried by said yoke member, said governor rod having one of its ends arranged to be engaged by one of said brake levers, compression means for returning the governor rod to its initial position when axially displaced by the brake lever, a carriage movable by said governor rod and having a dog releasably engaging the teeth on said bar member, and means when slack occurs in the braking apparatus for causing the actuation of said governor rod whereby to move said levers and members towards each other so as to automatically take up the slack.

4. A brake equalizing device for vehicles including a pair of brake levers, means operatively connecting the levers to the brakes, a pair of coacting reciprocating members connected to said brake levers, locking means for releasably holding said members in fixed position relative to each other, means for actuating said levers and said members as a unit to apply the brake, means operable by one of said levers for moving said levers toward each other to take up slack in the braking apparatus, and means for releasing the holding means to permit the free movement of said members relative to each other.

5. A brake equalizing device for vehicles including a pair of brake levers, means operatively connecting the levers to the brakes, a pair of coacting reciprocating members connected to said brake levers, locking means for releasably holding said members in fixed position relative to each other, means for actuating said levers and said members as a unit to apply the brake, means operable by one of said levers for moving said levers toward each other to take up slack in the braking apparatus, and means for simultaneously releasing the holding means to permit the free longitudinal movement of said members relative to each other.

6. A brake equalizing device for vehicles, including a pair of brake levers, means operatively connecting the levers to the brakes, a pair of telescopic members connected to said brake levers, locking means for releasably holding said members in fixed position relative to each other, means for actuating said levers and said members as a unit to apply the brake, means operable by one of said levers for moving said members towards each other to take up slack in the braking apparatus, and means for releasing the holding means to permit the free movement of said members relative to each other, whereby to permit the parts to be readily dismantled.

7. A brake equalizing device for vehicles including a pair of brake levers, means operatively connecting the levers to the brakes, a yoke member connected to one of the levers, a bar member connected to the other lever and having its free end portion movable between the arms of the yoke member, means for releasably holding said members, means for actuating said levers and said members as a unit to apply the brakes, means operable by one of said levers for moving said members towards each other to take up slack in the braking apparatus, and means for releasing the holding means to permit the free movement of said members.

8. A brake equalizing device for vehicles including a pair of brake levers, means operatively connecting the levers to the brakes, a yoke member connected to one of the levers, a bar member connected to the other lever and having its free end portion movable between the arms of the yoke member, said bar having a ratchet surface, a holding dog carried by said yoke and arranged releasably to engage the ratchet to prevent movement of the members relative to each other, a movable carriage operable by one of said levers, said carriage having a dog pivotally mounted thereon and arranged to engage said ratchet for locking the bar member to the carriage, means when the carriage is held by the bar member for releasing the engagement of said members with each other, means when said members are released for returning the carriage to its initial position, and means for releasing the dogs from the ratchet to permit the free movement of said members relative to each other.

9. A brake equalizing device for vehicles including brake levers, means operatively connecting the levers to the brakes of the wheels, an adjusting device operatively connected to said brake levers, means for actuating said levers to move the same toward each other to apply the brakes, and a displaceable member operatively connected to the adjusting device and arranged when slack develops in the braking apparatus and the levers are moved to apply the brakes, to be actuated by one of the levers to effect the operation of the adjusting device to take up the slack.

10. A brake equalizing device for vehicles including brake levers, means operatively connecting the levers to the brakes of the wheels, an adjusting device operatively connected to said brake levers, means for actuating said levers to move the same toward each other to apply the brakes, and a reciprocating member operatively connected to the adjusting device and positioned in the path of movement of one of said levers so as to be operatively engaged by the same when slack develops in the braking apparatus and the levers are moved to apply the brakes, whereby to operate the adjusting device to take up the slack.

11. A brake equalizing device for vehicles including a front brake lever and a spaced rear brake lever, means operatively connecting the levers to the brakes of the wheels, an adjusting device interposed between said levers, means operatively connecting the adjusting device to said levers, means for actuating said levers to apply the brakes, said levers being moved toward each other to apply the brakes, and a reciprocating member operatively connected to the adjusting device and positioned in the path of movement of the front brake lever so as to be operatively engaged by the same when slack develops in the braking apparatus and the levers are moved to apply the brakes, whereby to operate the adjusting device to take up the slack.

12. A brake equalizing device for motor vehicles including a floating front brake lever, an equalizing lever connected to one end of the front brake lever, means connecting the equalizing to the brakes of the front wheels, a foot pedal connected to the other end of the front brake lever, a rear brake lever pivotally connected at one end to a fixed support, a rear equalizing lever connected to the other end of said rear brake lever, means connecting the rear equalizing lever to the brakes of the rear wheels, an adjusting device, means connecting the adjusting device to intermediate portions of the brake levers, said levers being movable toward each other to apply the brakes, and a reciprocating member operatively connected to the adjusting device and positioned in the path of movement of the floating lever so as to be engaged by the same when slack develops in the braking apparatus and the levers are moved to apply the brakes, whereby to operate the adjusting device to take up the slack.

JAMES AMOS HICKS.